US012098742B2

(12) United States Patent
Tokumoto

(10) Patent No.: US 12,098,742 B2
(45) Date of Patent: Sep. 24, 2024

(54) NON-LOOSENING BOLT

(71) Applicant: Toshimitu Tokumoto, Akashi (JP)

(72) Inventor: Toshimitu Tokumoto, Akashi (JP)

(*) Notice: Subject to any disclaimer, the term of this patent is extended or adjusted under 35 U.S.C. 154(b) by 206 days.

(21) Appl. No.: 17/930,002

(22) Filed: Sep. 6, 2022

(65) Prior Publication Data

US 2022/0412393 A1    Dec. 29, 2022

Related U.S. Application Data

(63) Continuation-in-part of application No. 17/511,588, filed on Oct. 27, 2021, now Pat. No. 11,920,626, and
(Continued)

(30) Foreign Application Priority Data

Apr. 30, 2019   (JP) .................................. 2019-087074
Mar. 6, 2020   (JP) .................................. 2020-039247

(51) Int. Cl.
     *F16B 39/38*         (2006.01)
     *F16B 39/282*      (2006.01)

(52) U.S. Cl.
     CPC ............ *F16B 39/38* (2013.01); *F16B 39/282* (2013.01); *F16B 2200/10* (2018.08)

(58) Field of Classification Search
     CPC ........ F16B 5/025; F16B 33/002; F16B 33/02; F16B 35/00; F16B 35/041; F16B 35/06;
(Continued)

(56) References Cited

U.S. PATENT DOCUMENTS 3,298,273 A * 1/1967 McKelvey .............. F16B 35/00
                                                            411/1
4,022,099 A * 5/1977 Ballantyne .......... F16B 25/0021
                                                         411/383

(Continued)

FOREIGN PATENT DOCUMENTS

JP     S48-049461 U1    6/1973
JP     H10-089334 A     4/1998
(Continued)

OTHER PUBLICATIONS

International Search Report (ISR) dated Mar. 24, 2020 in PCT/JP2020/003078 filed Jan. 29, 2020 and published as WO 2020 116666 A1 and WO 2020 116666 A8 on Jun. 11, 2020, of which International Application the present application is a continuation-in-part.

(Continued)

*Primary Examiner* — Roberta S Delisle
(74) *Attorney, Agent, or Firm* — JTT Patent Services, LLC; Gerald T. Peters

(57) ABSTRACT

A nonloosening bolt may comprise a first bolt and a second bolt. The first bolt may have a bolt head, and the second bolt may have a threaded tip. Conversely, the first bolt may have a threaded tip, and the second bolt may have a bolt head. The first bolt may comprise an eccentric columnar portion having a small-diameter male-threaded portion at an outside circumference thereof. The second bolt may comprise a small-diameter female-threaded hole that threadedly engages with the small-diameter threaded portion. Threaded engagement between the small-diameter threaded portion and the small-diameter threaded hole may result in a constitution in which the central axes and pitches of the threaded portions at the outside circumferences of the first bolt and the second bolt are aligned. An eccentric frustoconical (Continued)

protrusion may be provided at the first bolt so as to fit within an eccentric frustoconical hole provided at the second bolt.

3 Claims, 9 Drawing Sheets

Related U.S. Application Data a continuation-in-part of application No. PCT/JP2021/008298, filed on Mar. 3, 2021, said application No. 17/511,588 is a continuation-in-part of application No. PCT/JP2020/016737, filed on Apr. 16, 2020.

(58) Field of Classification Search
CPC ........ F16B 39/00; F16B 39/28; F16B 39/282; F16B 39/34; F16B 39/38; F16B 2200/10
USPC ........ 411/190, 378, 381–382, 383, 396–397, 411/411, 424
See application file for complete search history.

(56) References Cited

U.S. PATENT DOCUMENTS

| | | | | |
|---|---|---|---|---|
| 4,309,140 | A | * | 1/1982 | Steffen .................. F16B 39/38 411/264 |
| 5,569,008 | A | * | 10/1996 | Chapkovich .......... F16B 33/006 411/383 |
| 5,785,476 | A | * | 7/1998 | McDonnell ............. F16B 15/00 411/908 |
| 7,588,402 | B2 | * | 9/2009 | Chuang ................. F16B 25/103 411/383 |
| 8,506,226 | B2 | * | 8/2013 | Martinez ................ F16B 35/02 411/383 |
| 11,920,626 | B2 | * | 3/2024 | Tokumoto ............. F16B 39/282 |
| 2009/0175701 | A1 | * | 7/2009 | Wu ....................... F16B 35/045 411/383 |
| 2010/0209212 | A1 | * | 8/2010 | Matarrodona ......... F16B 35/02 411/366.3 |
| 2022/0049738 | A1 | * | 2/2022 | Tokumoto .............. F16B 39/34 |
| 2022/0412393 | A1 | * | 12/2022 | Tokumoto .............. F16B 39/36 |

FOREIGN PATENT DOCUMENTS

| | | | |
|---|---|---|---|
| JP | 2000-074031 | A | 3/2000 |
| JP | 2001-311417 | A | 11/2002 |
| JP | 2010-043678 | A | 2/2010 |
| JP | 3186719 | U | 10/2013 |
| JP | 3187298 | U | 11/2013 |
| JP | 2018-040495 | A | 3/2018 |
| JP | 6640967 | B1 | 2/2020 |
| JP | 2020-091019 | A | 6/2020 |
| JP | 2020-183772 | A | 11/2020 |
| JP | 6892892 | B2 | 6/2021 |
| JP | 2021-139471 | A | 9/2021 |
| WO | 2020 116666 | A1 | 6/2020 |
| WO | 2020 222298 | A1 | 11/2020 |
| WO | 2021 177384 | A1 | 9/2021 |

OTHER PUBLICATIONS

International Preliminary Report on Patentability (IPRP) dated Jun. 8, 2021 in PCT/JP2020/003078 filed Jan. 29, 2020 and published as WO 2020 116666 A1 and WO 2020 116666 A8 on Jun. 11, 2020, of which International Application the present application is a continuation-in-part.

International Search Report (ISR) dated Jun. 23, 2020 in PCT/JP2020/016737 filed Apr. 16, 2020 and published as WO 2020 222298 A1 on Nov. 5, 2020, of which International Application the present application is a continuation-in-part.

International Preliminary Report on Patentability (IPRP) dated approximately Mar. 26, 2021 in PCT/JP2020/016737 filed Apr. 16, 2020 and published as WO 2020 222298 A1 on Nov. 5, 2020, of which International Application the present application is a continuation-in-part.

International Search Report (ISR) dated May 18, 2021 in PCT/JP2021/008298 filed Mar. 3, 2021 and published as WO 2021 177384 A1 on Sep. 10, 2021, of which International Application the present application is a continuation-in-part.

International Preliminary Report on Patentability (IPRP) dated Sep. 6, 2022 in PCT/JP2021/008298 filed Mar. 3, 2021 and published as WO 2021 177384 A1 on Sep. 10, 2021, of which International Application the present application is a continuation-in-part.

Applicant brings to the attention of the Examiner the fact that Box VII-2 of the Request in PCT/JP2021/008298 filed Mar. 3, 2021 and pubd as WO 2021 177384 A1 on Sep. 10, 2021, of which Intl App the present application is a continuation-in-part, contained a request to use the search results of a previous app, i.e., JP Pat App No 2018-229875 filed Dec. 7, 2018. See NPL Cite Nos. 1-2, 5-6, and 8. This concise explanation will serve in lieu of translation.

Applicant brings to the attention of the Examiner the fact that Box VI-1 of the Request in PCT/JP2020/003078 filed Jan. 29, 2020 and pubd as WO 2020 116666 A1/A8 on Jun. 11, 2020, of which Intl App the present application is a CIP, contained a request—which was ultimately denied—to restore the priority of JP Pat App No 2018-229875 filed Dec. 7, 2018. See NPL Cite Nos. 1-2, 5-6, and 7. This concise explanation will serve in lieu of translation.

Applicant brings to the attention of the Examiner the existence of possibly related US Pat U.S. Appl. No. 17/511,588, which was filed on Oct. 27, 2021 and which published as US 2022 0049738 A1 on Feb. 17, 2022, which is a continuation-in-part of Intl App No. PCT/JP2020/016737 filed on Apr. 16, 2020 and published as WO 2020 222298 A1 on Nov. 5, 2020, all of which have overlapping inventorship/ownership with the present case.

\* cited by examiner

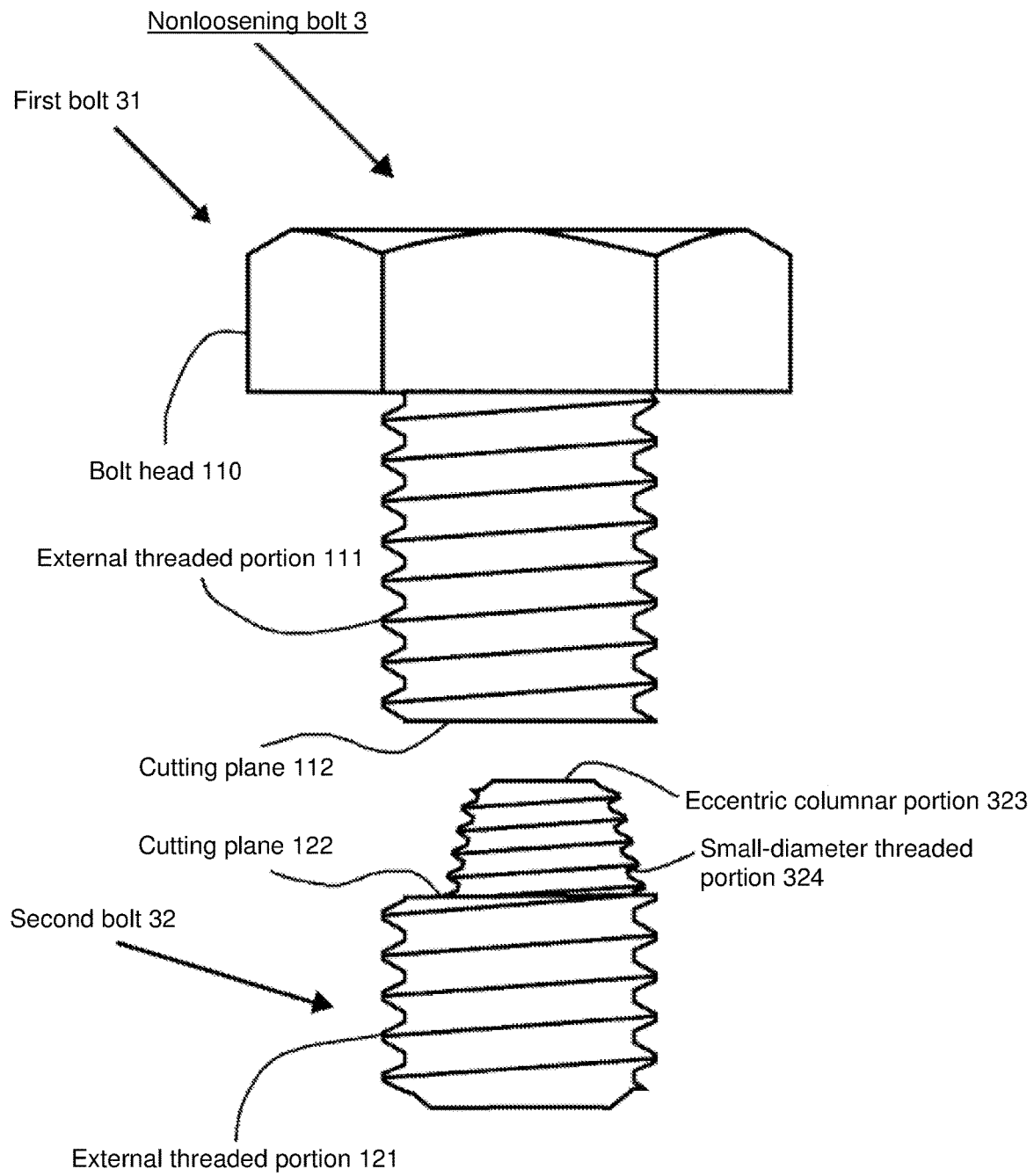

NON-LOOSENING BOLT

CROSS-REFERENCE TO RELATED APPLICATIONS, BENEFIT/PRIORITY CLAIMS, AND INCORPORATIONS BY REFERENCE

This application is a continuation-in-part of and claims benefit under 35 USC 120 and 365(c) to copending International Application No PCT/JP2021/008298, entitled "Non-Loosening Bolt", filed 3 Mar. 2021; further is a continuation-in-part of and claims benefit under 35 USC 120 and 365(c) to International Application No PCT/JP2020/003078, entitled "Non-Loosening Bolt", filed 29 Jan. 2020, the aforesaid PCT/JP2020/003078 having been copending at the time of filing of the aforesaid PCT/JP2021/008298; further is a continuation-in-part of and claims benefit under 35 USC 120 to copending U.S. patent application Ser. No. 17/511,588, entitled "Non-Loosening Bolt", filed 27 Oct. 2021, which is a continuation-in-part of International Application No PCT/JP2020/016737, entitled "Non-Loosening Bolt", filed 16 Apr. 2020; further claims benefit of priority under 35 USC 119(a)-(d) to Japanese Patent Application No 2020-039247, entitled "Non-Loosening Bolt", filed 6 Mar. 2020; and further claims benefit of priority under 35 USC 119(a)-(d) to Japanese Patent Application No 2019-087074, entitled "Non-Loosening Bolt", filed 30 Apr. 2019, the contents of all of the foregoing applications and additionally Japanese Patent Application No 2018-229875, entitled "Non-Loosening Bolt", filed 7 Dec. 2018, being incorporated herein in their entireties by reference.

STATEMENT REGARDING PRIOR DISCLOSURES BY INVENTOR UNDER 37 CFR 1.77(b)(6)

The following patents and published patent applications are disclosures by, originating with, and/or attributable to the inventor of the present application:
JP 6640967 B1 ("Non-Loosening Bolt"; 5 Feb. 2020);
JP 2020 091019 A ("Non-Loosening Bolt"; 11 Jun. 2020);
WO 2020 116666 A1 ("Non-Loosening Bolt"; 11 Jun. 2020);
JP 2020 183772 A ("Non-Loosening Bolt"; 12 Nov. 2020);
JP 6892892 B2 ("Non-Loosening Bolt"; 23 Jun. 2021);
WO 2020 222298 A1 ("Non-Loosening Bolt"; 5 Nov. 2020);
US 2022 0049738 A1 ("Non-Loosening Bolt"; 17 Feb. 2022);
JP 2021 139471 A ("Non-Loosening Bolt"; 16 Sep. 2021); and
WO 2021 177384 A1 ("Non-Loosening Bolt"; 10 Sep. 2021).

FIELD OF THE INVENTION

The present invention relates to a nonloosening bolt. In particular, it relates to a bolt which has antiloosening capability and which may be used as a tap bolt.

BACKGROUND

When a tap bolt is subjected to vibration or impact, a gap can form momentarily between the bolt and the surface against which it is tightened, such that a load no longer acts on the bolt, in accompaniment to which rotation of the bolt may occur and there may be occurrence of loosening.

One embodiment of the present invention is a nonloosening bolt that provides reliable antiloosening effect as a result of eccentric threaded engagement between a protrusion on one bolt member and a recess on another bolt member. The nonloosening bolt in accordance with such an embodiment may be such that it comprises—as if the shaft of a single bolt had been cut into two perpendicularly with respect to the shaft at a location midway along the shaft—a first bolt having a bolt head and a second bolt having a bolt tip, the second bolt being such that an eccentric columnar portion which has male threads at an outside circumferential surface at the bolt shaft cutting plane is formed thereat, the central axis of said eccentric columnar portion being eccentric by a small amount with respect to the central axis of the bolt, the first bolt being such that a threaded hole that threadedly engages with the eccentric columnar portion of the second bolt is formed thereat, the central axis of said threaded hole being eccentric by a small amount with respect to the central axis of the bolt, female threads being formed at an inside circumferential surface thereof. Thus, in accordance with such an embodiment, because the eccentric columnar portion and the threaded hole are eccentric, after the first bolt and the second bolt have been threadedly engaged to form a single tap bolt that is used to fasten a member, when only the second bolt is rotated in a direction such as tends to cause tightening, the bolts will be respectively misaligned in the radial direction relative to the axis of the threaded hole, causing application of a large stress that acts in the radial direction on the threaded shaft. The large stress which acts in the radial direction based on the principle of the lever as determined by the ratio between the eccentricity and the radius of the shaft of the eccentric columnar portion makes it possible to provide extremely superb antiloosening effect.

However, there has been a problem with nonloosening bolts in accordance with the foregoing embodiment in that because there has been concentration of stress due to the fact that the cutting plane and the eccentric columnar portion are perpendicular while the diameter of the eccentric columnar portion is less than the diameter of the bolt shaft, there has been a tendency for the eccentric columnar portion to break at its base.

There is therefore a need for a bolt which solves the problems of nonloosening bolts in accordance with the foregoing embodiment, which is such that the eccentric columnar portion tends not to break, and which makes it possible to obtain robust and reliable antiloosening effect.

SUMMARY OF INVENTION

A nonloosening bolt in accordance with another embodiment of the present invention comprises—as if the shaft of a single bolt had been cut into two perpendicularly with respect to the shaft at a location midway along the shaft—a first bolt having a bolt head and a second bolt having a bolt tip, the second bolt being such that an eccentric columnar portion which has male threads at an outside circumferential surface at the bolt shaft cutting plane is formed thereat, the central axis of said eccentric columnar portion being eccentric by a small amount with respect to the central axis of the bolt, the first bolt being such that a threaded hole that threadedly engages with the eccentric columnar portion of the second bolt is formed thereat, the central axis of said threaded hole being eccentric by a small amount with respect to the central axis of the bolt, female threads being formed at an inside circumferential surface thereof; and whereas provided at the cutting plane of the second bolt is a frustoconical protrusion which has a central axis that is eccentric by a small amount with respect to the central axis of the bolt, an eccentric columnar portion which has a central axis that is eccentric by a small amount with respect to the central axis of the bolt being formed above this protrusion, provided at the cutting plane of the first bolt is a frustoconical hole within which the frustoconical protrusion of the second bolt fits and which has a central axis that is eccentric by a small amount with respect to the central axis of the bolt, a threaded hole which threadedly engages with the eccentric columnar portion of the second bolt and which has a central axis that is eccentric by a small amount with respect to the central axis of the bolt being formed at a location further in the depth direction of this hole. By thus causing a frustoconical protrusion to be provided between the cutting plane and the eccentric columnar portion of the second bolt, it is possible to increase diameter at the base of the columnar portion, and—inasmuch as there is an obtuse angle at the cutting plane and the eccentric columnar portion—to relieve stresses that would otherwise be concentrated thereat, and it is possible to reduce the tendency for the eccentric columnar portion to break at its base.

One or more embodiments of the present invention make it possible to provide a nonloosening bolt at which a first bolt and a second bolt are combined, the bolt being such that an eccentric columnar portion tends not to break, and such that robust and reliable antiloosening effect can be obtained.

Other embodiments, systems, methods, and features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 9 is a front view of the nonloosening bolt of FIG. 8.

EMBODIMENTS FOR CARRYING OUT THE INVENTION

Examples of embodiments of nonloosening bolts will be described using the drawings.

As the foregoing embodiments and the embodiments described below are merely examples for the purpose of describing the present invention, it should be understood that the present invention is not limited to the specific embodiments below.

Working Example 1

Figure 1:
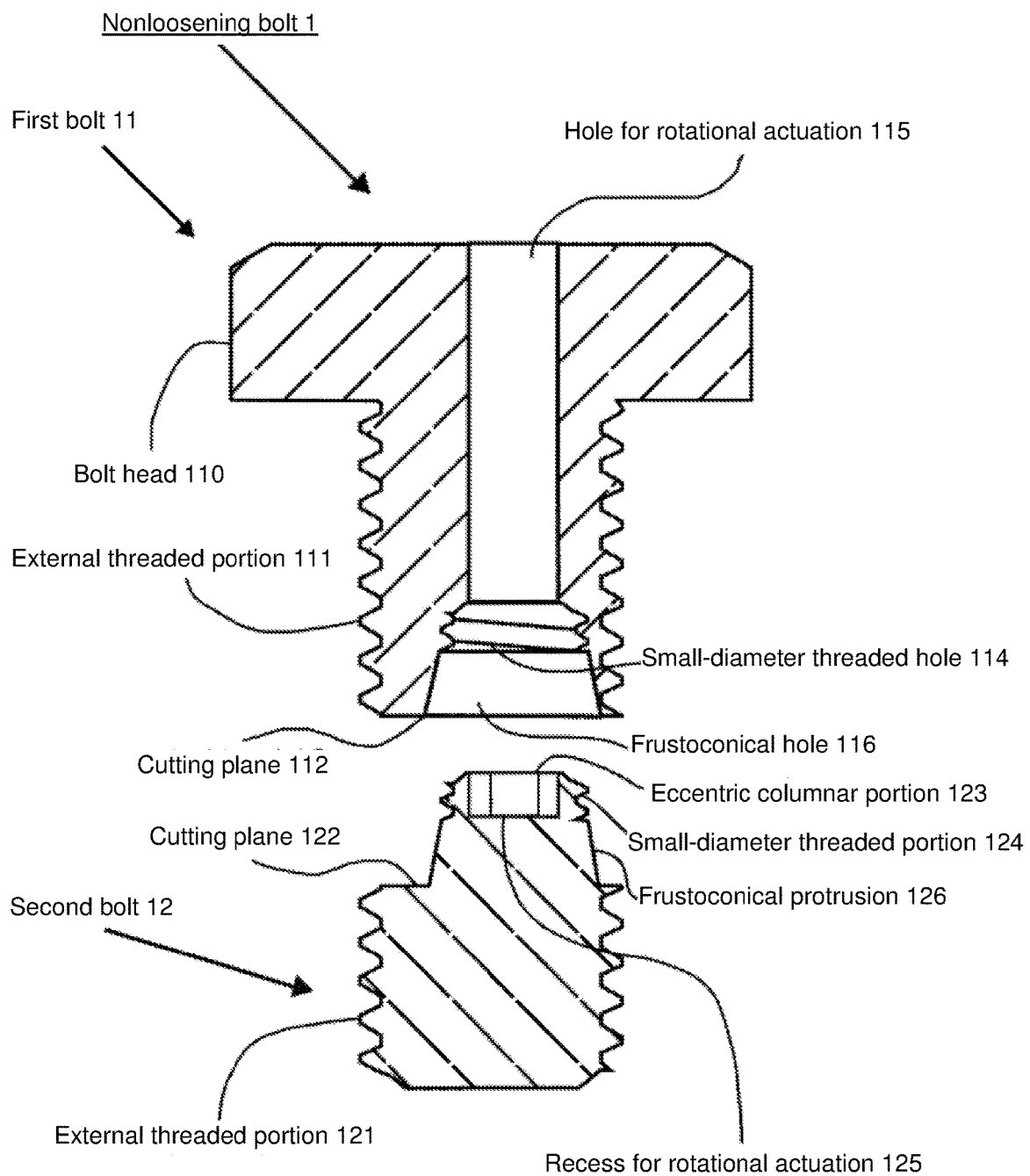
FIG. 1 is sectional view of a nonloosening bolt that is provided with a frustoconical protrusion between a cutting plane and an eccentric columnar portion at a second bolt.
Figure 2:
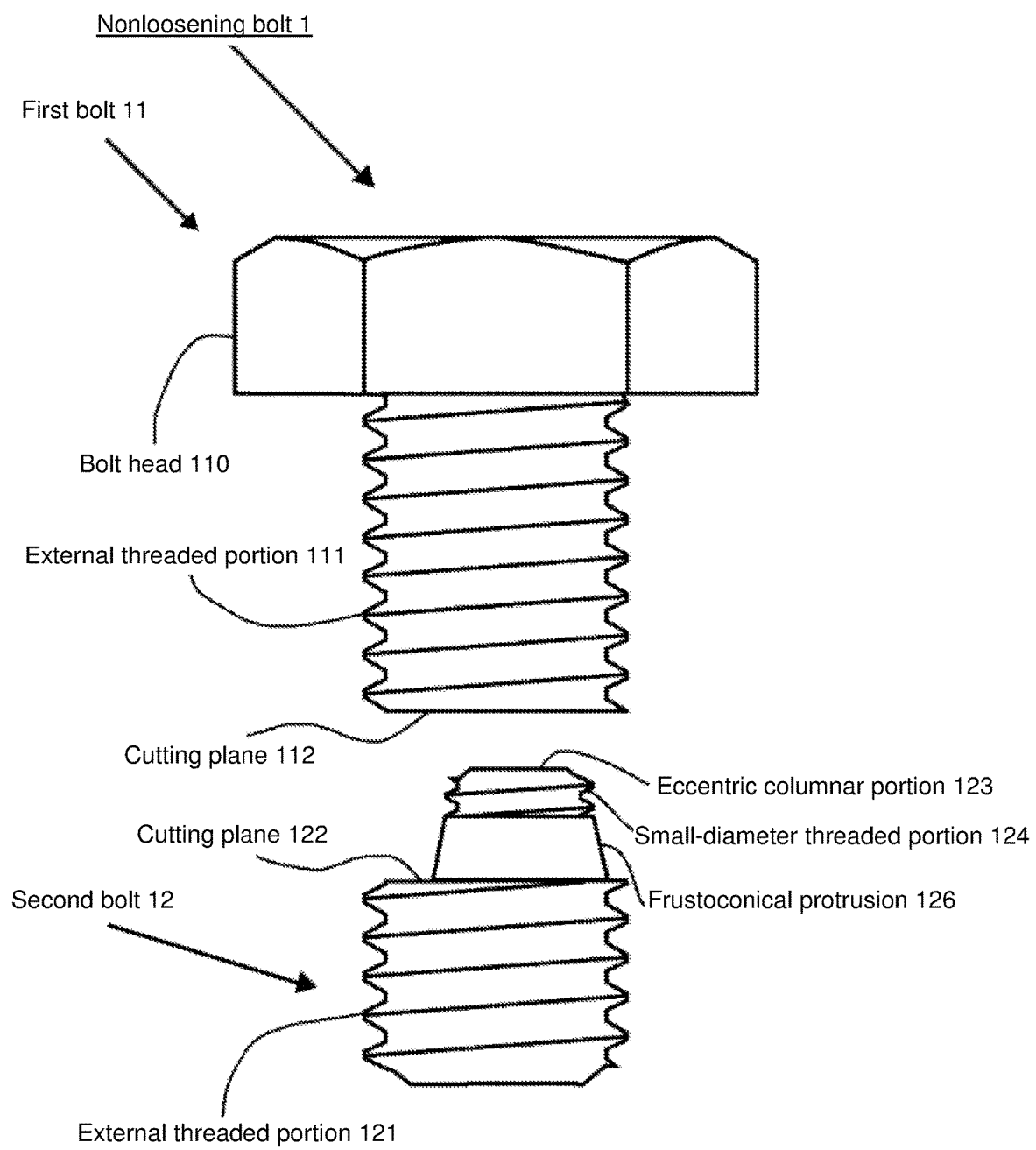
FIG. 2 is a front view of the nonloosening bolt of FIG. 1.
Figure 3:
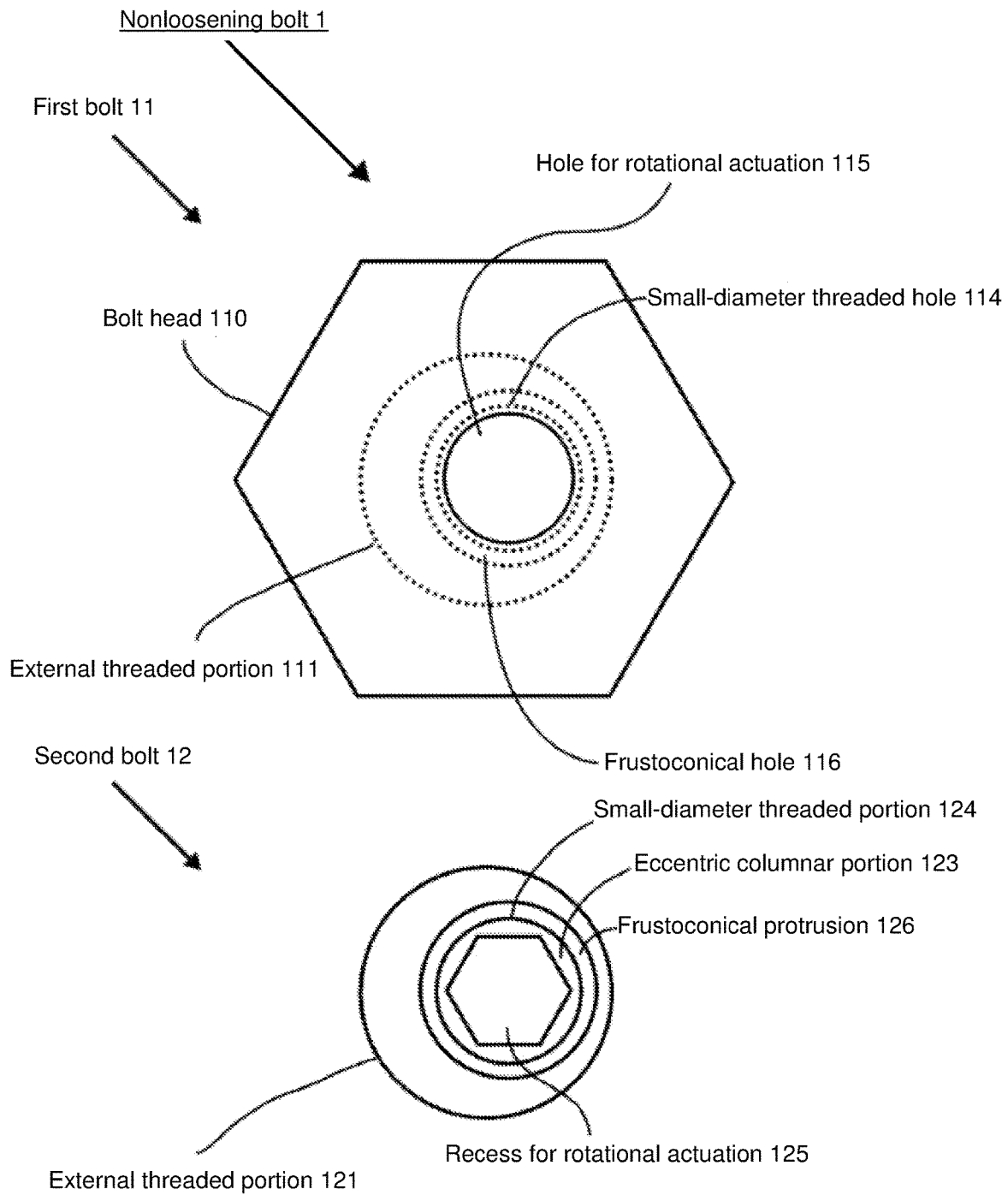
FIG. 3 is a top view of the nonloosening bolt of FIG. 1.

As shown in FIG. 1, nonloosening bolt 1 comprises first bolt 11 and second bolt 12.

1. First Bolt 11

First bolt 11 has an external threaded portion 111 which is threaded for threaded engagement with a bolt hole at the outside circumference thereof. In accordance with the present embodiment, as viewed from the side, first bolt 11 is a bolt which is equipped with a bolt head and which is equipped with a male-threaded external threaded portion 111 at the outside circumference thereof.

In addition, at first bolt 11, small-diameter threaded hole 114 and frustoconical hole 116 are formed at cutting plane 112 between it and second bolt 12.

Frustoconical hole 116 is of smaller diameter than first bolt 11. Furthermore, frustoconical hole 116 is formed so as to be eccentric in a perpendicular direction with respect to the central axis of first bolt 11.

Formed at a location further in the depth direction of frustoconical hole 116 is small-diameter threaded hole 114. Small-diameter threaded hole 114 is of smaller diameter than first bolt 11, being of the same diameter as the top face (the smaller of the faces) of frustoconical hole 116. Furthermore, small-diameter threaded hole 114 is formed so as to be eccentric in a perpendicular direction with respect to the central axis of first bolt 11. The eccentric dimension of frustoconical hole 116 with respect to the central axis of first bolt 11 is equal to the eccentric dimension of small-diameter threaded hole 114 with respect to the central axis of first bolt 11.

Moreover, at first bolt 11, a hole 115 for rotational actuation which extends all the way through first bolt 11 to reach small-diameter threaded hole 114 is formed in a direction parallel to the central axis of first bolt 11.

2. Second Bolt 12

Second bolt 12 has an external threaded portion 121 which is threaded for threaded engagement with a bolt hole at the outside circumference thereof. External threaded portion 121 has the same pitch and is in the same direction as external threaded portion 111 so as to be continuous with external threaded portion 111 of first bolt 11.

In accordance with the present embodiment, second bolt 12 as viewed from the side is of columnar shape and has external threaded portion 121 at the outside circumference thereof, the external appearance thereof as viewed from the side being that of a bolt which does not have a bolt head.

In addition, at second bolt 12, frustoconical protrusion 126 and eccentric columnar portion 123 are provided in protruding fashion at cutting plane 122 between it and first bolt 11. This frustoconical protrusion 126 is of smaller diameter than the diameter of bolt 12. Furthermore, frustoconical protrusion 126 is provided in protruding fashion so as to eccentric in a direction perpendicular to the central axis of bolt 12. The eccentric dimension of frustoconical protrusion 126 with respect to the central axis of bolt 12 is equal to the eccentric dimension of frustoconical hole 116 with respect to the central axis of first bolt 11 at first bolt 11.

Moreover, eccentric columnar portion 123 is provided in protruding fashion at frustoconical protrusion 126. This eccentric columnar portion 123 is of smaller diameter than bolt 12, being of the same diameter as the top face (the smaller of the faces) of frustoconical protrusion 126. Furthermore, eccentric columnar portion 123 is provided in protruding fashion so as to be eccentric in a direction perpendicular to the central axis of bolt 12. The eccentric dimension of eccentric columnar portion 123 with respect to the central axis of bolt 12 is equal to the eccentric dimension of small-diameter threaded hole 114 with respect to the central axis of first bolt 11 at first bolt 11.

Furthermore, male threads are formed at the outside circumference of eccentric columnar portion 123, small-diameter threaded portion 124 being formed thereat. In addition, frustoconical protrusion 126 is arranged so as to fit within frustoconical hole 116 when in a state such that cutting plane 112 and cutting plane 122 are made to come into mutual contact.

Figure 4:
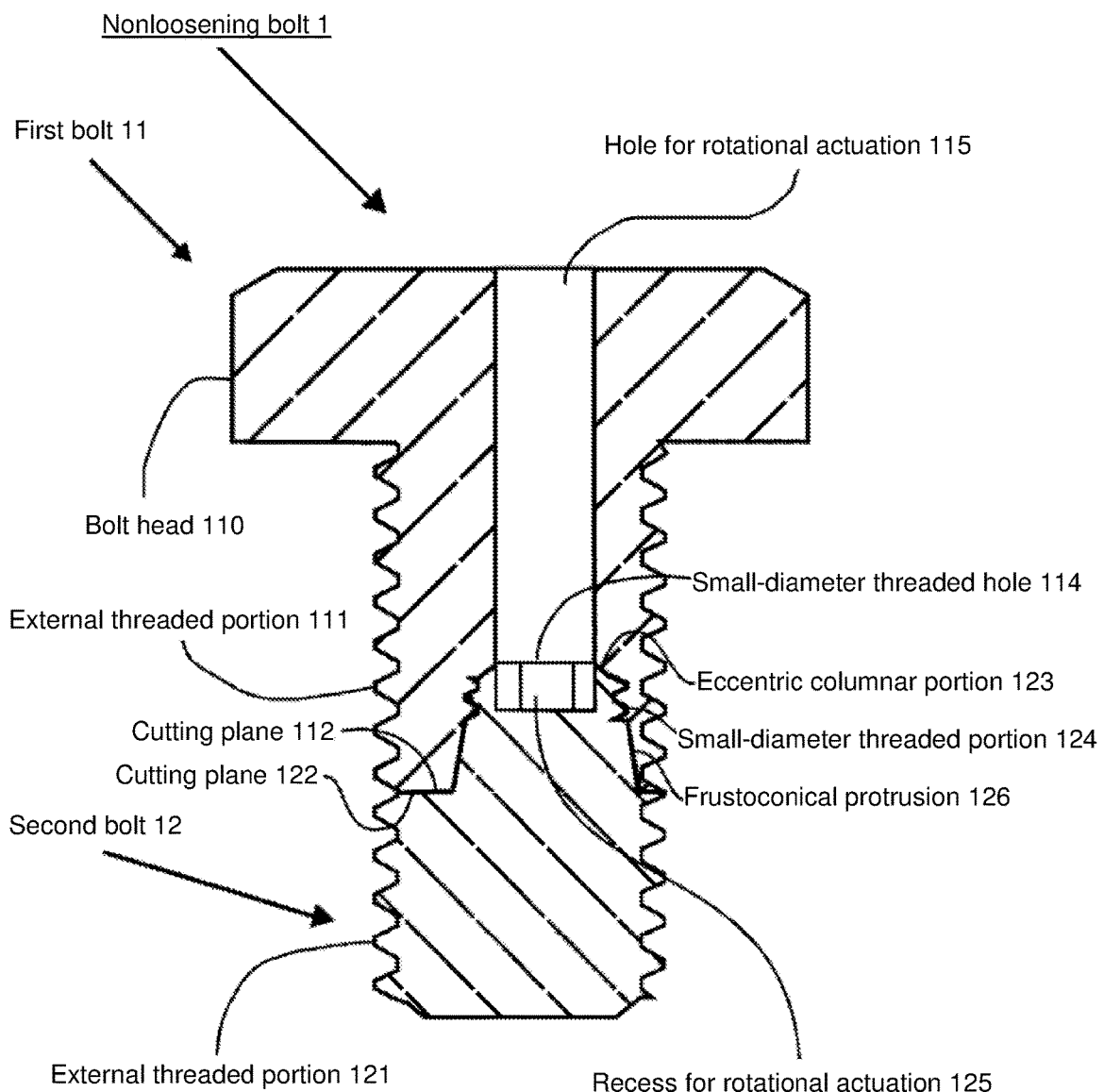
FIG. 4 is a sectional view showing the nonloosening bolt of FIG. 1 in a state in which the first bolt and the second bolt are combined.
Figure 5:
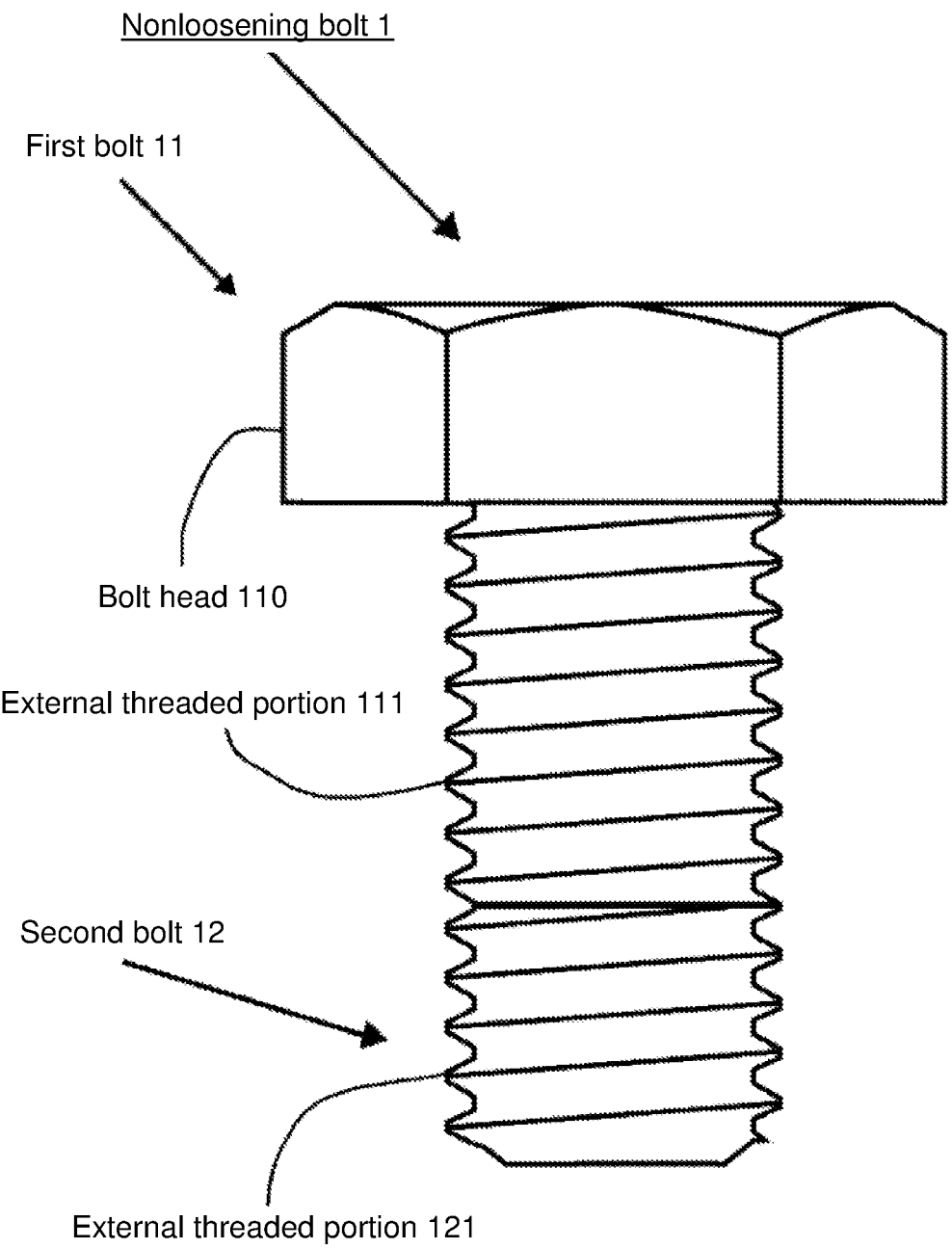
FIG. 5 is a front view showing the nonloosening bolt of FIG. 1 in a state in which the first bolt and the second bolt are combined.

Moreover, when as shown by way of example in FIG. 4 small-diameter threaded portion 124 of second bolt 12 is threadedly engaged with small-diameter threaded hole 114 of first bolt 11 such that mutually opposed cutting plane 112 and cutting plane 122 of first bolt 11 and second bolt 12 are made to come in contact, this results in a constitution as shown by way of example in FIG. 4 and FIG. 5 in which external threaded portion 111 of first bolt 11 and external threaded portion 121 of second bolt 12 are such that their central axes are aligned and their pitches are made to be continuous.

In addition, as shown by way of example at FIG. 4, recess 125 for rotational actuation is formed at the top face of eccentric columnar portion 123, this being formed so as to be disposed directly below hole 115 for rotational actuation which extends all the way through first bolt 11.

3. Method of Using Nonloosening Bolt 1

3.1 During Normal Use (Prior to Fastening)

Before carrying out fastening using nonloosening bolt 1, first bolt 11 and second bolt 12 are combined and placed in position as shown in FIG. 4 and FIG. 5. More specifically, small-diameter threaded portion 124 of second bolt 12 is threadedly engaged with small-diameter threaded hole 114 of first bolt 11 while in a state such that mutually opposed cutting plane 112 and cutting plane 122 come in contact.

When in this state, first bolt 11 and second bolt 12 will be aligned as seen in plan view, while at the same time the pitches and central axes of the external threaded portion 111 and the external threaded portion 121 of the two will be aligned. This being the case, first bolt 11 and second bolt 12 can be threadedly engaged with a bolt hole as if they were a single bolt.

3.2 During Fastening

In addition, during fastening of nonloosening bolt 1, first bolt 11 and second bolt 12 which have been placed in position are first threadedly engaged with a bolt hole and are rotated in a direction such as will cause tightening until a prescribed torque acts thereon.

At such time, force may be applied to bolt head 110 of first bolt 11 relative to the bolt hole to cause rotation in a direction such as will cause tightening until a prescribed torque acts on the bolt hole.

Here, because mutually opposed cutting plane 112 and cutting plane 122 of first bolt 11 and second bolt 12 are in contact, when a force is applied to bolt head 110 of first bolt 11 to cause rotation in a direction such as will cause tightening, second bolt 12 will move in such fashion as to follow this motion.

A rotational actuation tool is thereafter inserted in hole 115 for rotational actuation at first bolt 11 and is captured by recess 125 for rotational actuation at second bolt 12, and only second bolt 12 is made to rotate by a prescribed angle in the same direction as the direction that would cause tightening thereof relative to first bolt 11.

By so doing, the locking effect due to the misalignment in the radial direction permits achievement of antiloosening capability. At this time, large forces act on eccentric columnar portion 123 and frustoconical protrusion 126, a large stress acting in particular at the base of frustoconical protrusion 126, but because the diameter at the base of frustoconical protrusion 126 is greater than the diameter of eccentric columnar portion 123, and because the base of frustoconical protrusion 126 is connected to cutting plane 122 by an obtuse angle, there is little tendency for it to break.

Thus, nonloosening bolt 1 in accordance with one embodiment of the present invention may be such that, after a member is fastened by first bolt 11 and second bolt 12, when only second bolt 12 is further rotated by a prescribed angle to obtain antiloosening effect in a manner that is easy and rapid as well as robust and reliable, eccentric columnar portion 123 is prevented from breaking at its base despite application of a large force to eccentric columnar portion 123.

Working Example 2

Figure 6:
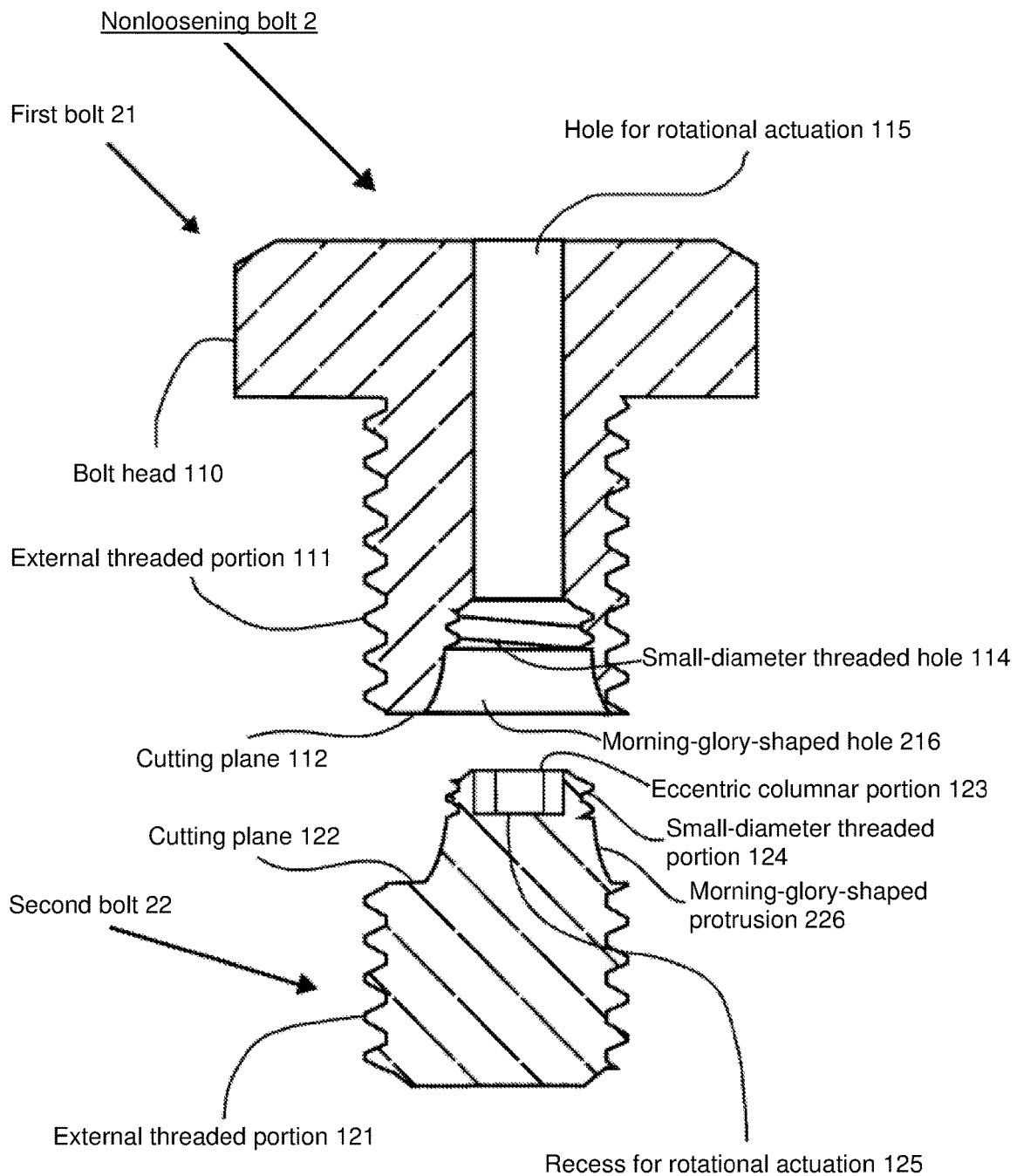
FIG. 6 is a sectional view of a nonloosening bolt that is provided with a morning-glory-shaped protrusion between a cutting plane and the lower portion of an eccentric columnar portion at a second bolt.
Figure 7:
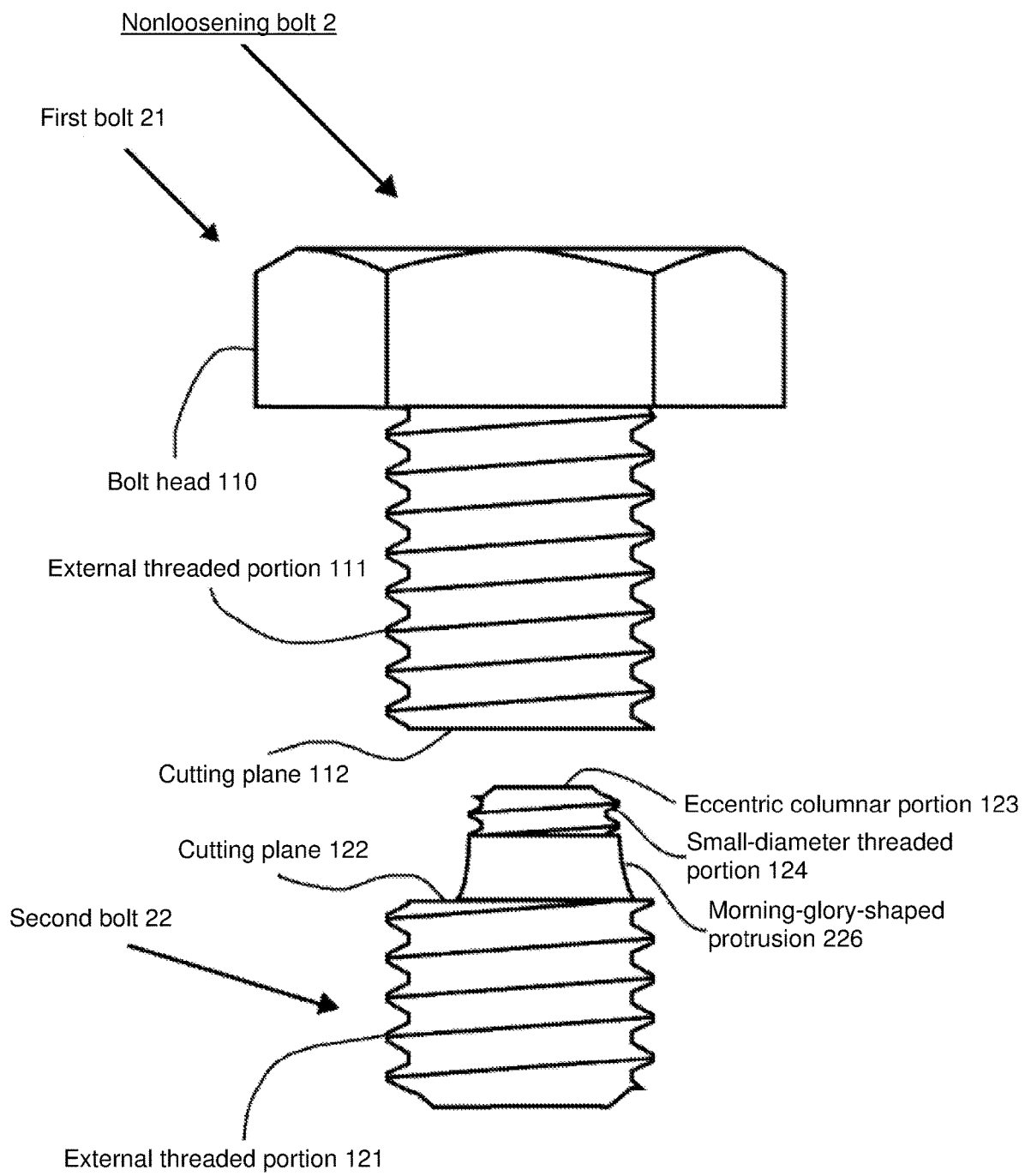
FIG. 7 is a front view of the nonloosening bolt of FIG. 6.

Whereas the side face of frustoconical protrusion 126 appears to be a linear inclined plane as seen in a sectional view which is parallel to the central axis at Working Example 1, notwithstanding that this is a curved inclined plane (in the shape of a morning glory from which the slender portion at the base thereof has been removed) as seen in a sectional view which is parallel to the central axis as shown in FIG. 6 and FIG. 7, because the diameter at the base of morning-glory-shaped protrusion 226 is greater than the diameter of eccentric columnar portion 123, and because the base of morning-glory-shaped protrusion 226 is connected to cutting plane 122 by an obtuse angle, it is possible to obtain an effect whereby eccentric columnar portion 123 is prevented from breaking at its base.

Working Example 3

Figure 8:
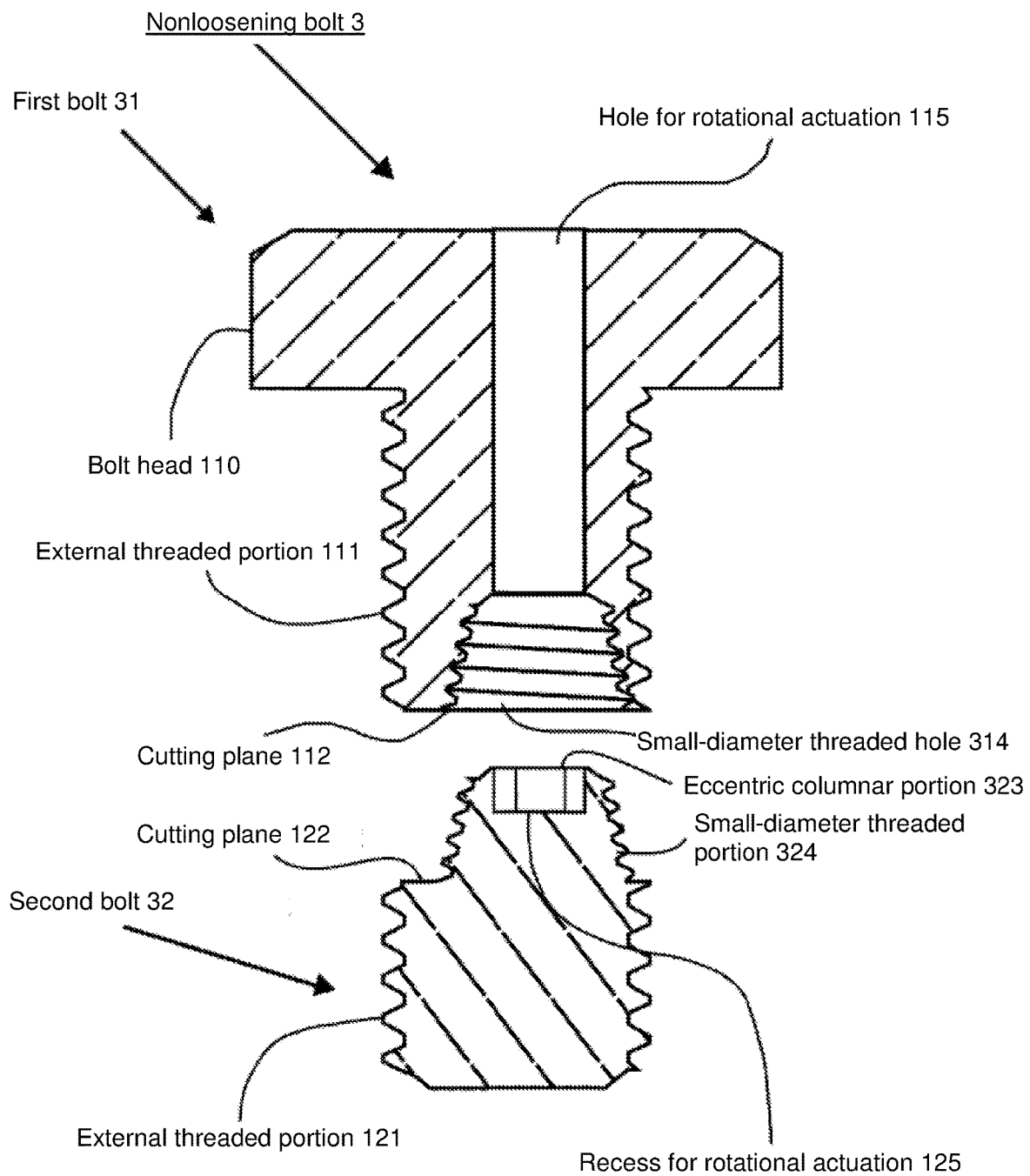
FIG. 8 is a sectional view of a nonloosening bolt in which an eccentric columnar portion at a second bolt and a small-diameter threaded hole at a first bolt have been made to have tapered threads.

As shown in FIG. 8 and FIG. 9, by causing eccentric columnar portion 323 of the second bolt to be frustoconical in shape, and causing male threads to be provided at the outside circumference of eccentric columnar portion 323 to form tapered male threads, and by causing small-diameter threaded hole 314 of the first bolt to also be frustoconical in shape, and causing female threads to be provided at the inside circumference of small-diameter threaded hole 314 to form tapered female threads, because the diameter at the base of frustoconical eccentric columnar portion 323 is greater than the diameter at the upper portion of eccentric columnar portion 323, and because the base of frustoconical eccentric columnar portion 323 is connected to cutting plane 122 by an obtuse angle, it is possible to obtain an effect whereby eccentric columnar portion 323 is prevented from breaking at its base.

EXPLANATION OF REFERENCE NUMERALS

| | |
|---|---|
| 1 | Nonloosening bolt |
| 11 | First bolt |
| 110 | Bolt head |
| 111 | External threaded portion |
| 112 | Cutting plane |

EXPLANATION OF REFERENCE NUMERALS

| | |
|---|---|
| 114 | Small-diameter threaded hole |
| 115 | Hole for rotational actuation |
| 116 | Frustoconical hole |
| 12 | Second bolt |
| 121 | External threaded portion |
| 122 | Cutting plane |
| 123 | Eccentric columnar portion |
| 124 | Small-diameter threaded portion |
| 125 | Recess for rotational actuation |
| 126 | Frustoconical protrusion |
| 2 | Nonloosening bolt |
| 21 | First bolt |
| 216 | Morning-glory-shaped hole |
| 22 | Second bolt |
| 226 | Morning-glory-shaped protrusion |
| 3 | Nonloosening bolt |
| 31 | First bolt |
| 314 | Small-diameter threaded hole |
| 32 | Second bolt |
| 323 | Eccentric columnar portion |
| 324 | Small-diameter threaded portion |

What is claimed is:

1. A nonloosening bolt which is a locking bolt comprising, in such form as if a single bolt having a threaded portion at an outside circumference thereof had been cut into two perpendicularly with respect to an axis thereof at a location midway along the axis thereof, a first bolt having a bolt head and a second bolt having a threaded tip, the nonloosening bolt being characterized in that at the cutting plane of one of the first bolt or the second bolt, an eccentric columnar portion which is smaller in diameter than a diameter of the shaft of the bolt is provided so as to protrude outward in an axial direction in eccentric fashion with respect to a direction perpendicular to the central axis of the bolt, and a small-diameter threaded portion at which male threads are formed is provided at an outside circumference of the eccentric columnar portion;

at the cutting plane of the other of the first bolt or the second bolt, a small-diameter threaded hole that threadedly engages with the small-diameter threaded portion is formed in eccentric fashion with respect to a direction perpendicular to the central axis of the bolt, female threads being formed at the interior thereof; and when the small-diameter threaded portion is threadedly engaged with the small-diameter threaded hole such that the cutting planes are made to come in contact in mutually opposed fashion, this results in a constitution in which the central axes and pitches of the threaded portions at the outside circumferences of the first bolt and the second bolt are aligned;

wherein provided between the cutting plane and the eccentric columnar portion in such fashion as to be eccentric in a perpendicular direction with respect to the central axis of the bolt is a frustoconical protrusion, and provided between the cutting plane and the small-diameter threaded hole in such fashion as to be eccentric in a perpendicular direction with respect to the central axis of the bolt is a frustoconical hole within which the frustoconical protrusion fits.

2. The nonloosening bolt according to claim 1 characterized in that, at the frustoconical protrusion between the cutting plane and the eccentric columnar portion recited at claim 1, an inclined side at a side face of the conical frustum as seen in a sectional view parallel to the central axis is curved, being in the shape of a morning glory from which the slender portion at the base thereof has been removed; and at the frustoconical hole between the cutting plane and the small-diameter threaded hole recited at claim 1, a hole into which a protrusion in the shape of the morning glory from which the slender portion at the base thereof has been removed will fit is provided.

3. A nonloosening bolt which is a locking bolt comprising, in such form as if a single bolt having a threaded portion at an outside circumference thereof had been cut into two perpendicularly with respect to an axis thereof at a location midway along the axis thereof, a first bolt having a bolt head and a second bolt having a threaded tip, the nonloosening bolt being characterized in that at the cutting plane of one of the first bolt or the second bolt, an eccentric columnar portion which is smaller in diameter than a diameter of the shaft of the bolt is provided so as to protrude outward in an axial direction in eccentric fashion with respect to a direction perpendicular to the central axis of the bolt, and a small-diameter threaded portion at which male threads are formed is provided at an outside circumference of the eccentric columnar portion;

at the cutting plane of the other of the first bolt or the second bolt, a small-diameter threaded hole that threadedly engages with the small-diameter threaded portion is formed in eccentric fashion with respect to a direction perpendicular to the central axis of the bolt, female threads being formed at the interior thereof; and when the small-diameter threaded portion is threadedly engaged with the small-diameter threaded hole such that the cutting planes are made to come in contact in mutually opposed fashion, this results in a constitution in which the central axes and pitches of the threaded portions at the outside circumferences of the first bolt and the second bolt are aligned;

wherein the eccentric columnar portion is frustoconical in shape and male threads are formed on a side face thereof; and wherein the small-diameter threaded hole has frustoconically shaped tapered threads at which female threads that threadedly engage with the frustoconical eccentric columnar portion are formed at the inside circumference thereof, provided between the cutting plane and the eccentric columnar portion in such fashion as to be eccentric in a perpendicular direction with respect to the central axis of the bolt is a frustoconical protrusion, and provided between the cutting plane and the small-diameter threaded hole in such fashion as to be eccentric in a perpendicular direction with respect to the central axis of the bolt is a frustoconical hole within which the frustoconical protrusion fits.

* * * * *